(12) United States Patent
Andonian et al.

(10) Patent No.: US 7,716,977 B2
(45) Date of Patent: May 18, 2010

(54) TIRE SENSOR SYSTEM AND METHOD

(75) Inventors: Archie Arsavir Takfor Andonian, Hudson, OH (US); Jin-hyo Oscar Song, Summerfield, NC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 105 days.

(21) Appl. No.: 12/176,588

(22) Filed: Jul. 21, 2008

(65) Prior Publication Data

US 2010/0011852 A1    Jan. 21, 2010

(51) Int. Cl.
*B60C 23/02* (2006.01)

(52) U.S. Cl. ......................................... 73/146.5; 73/146

(58) Field of Classification Search ........................ None
See application file for complete search history.

(56) References Cited

U.S. PATENT DOCUMENTS

| | | | | |
|---|---|---|---|---|
| 2,138,310 A * | 11/1938 | Svenson | ...................... | 338/100 |
| 3,999,431 A * | 12/1976 | Makarainen | ............... | 73/146.5 |
| 5,025,244 A * | 6/1991 | Huang | ......................... | 340/442 |
| 6,025,807 A * | 2/2000 | Jon et al. | ..................... | 343/742 |
| 7,406,876 B2 * | 8/2008 | Krozer et al. | ................. | 73/777 |
| 7,439,928 B2 * | 10/2008 | Forster et al. | ............... | 343/806 |
| 7,492,328 B2 * | 2/2009 | Kish et al. | ................... | 343/897 |
| 2003/0184493 A1 * | 10/2003 | Robinet et al. | ............. | 343/867 |
| 2003/0217797 A1 * | 11/2003 | Poulbot et al. | ........... | 152/152.1 |

* cited by examiner

*Primary Examiner*—Lisa M Caputo
*Assistant Examiner*—Jermaine Jenkins
(74) *Attorney, Agent, or Firm*—Richard B. O'Planick

(57) ABSTRACT

A tire and sensor system and method includes a tire having an inflatable radially inward tire casing and a radially outward tire tread ring situated on the casing and a sensor system. The sensor system includes a first conductive medium affixed to a radially inward surface of the tread ring and a second conductive medium affixed to a radially outward surface of the casing. The second conductive medium operatively contacts the first conductive medium in a desired, relative orientation between the tire casing and the tread ring and operatively separates from the first conductive medium when tire casing and the tread ring depart from the desired orientation. A sensor is connected to the second conductive medium for operatively detecting separation of the second conductive medium from the first conductive medium.

16 Claims, 9 Drawing Sheets

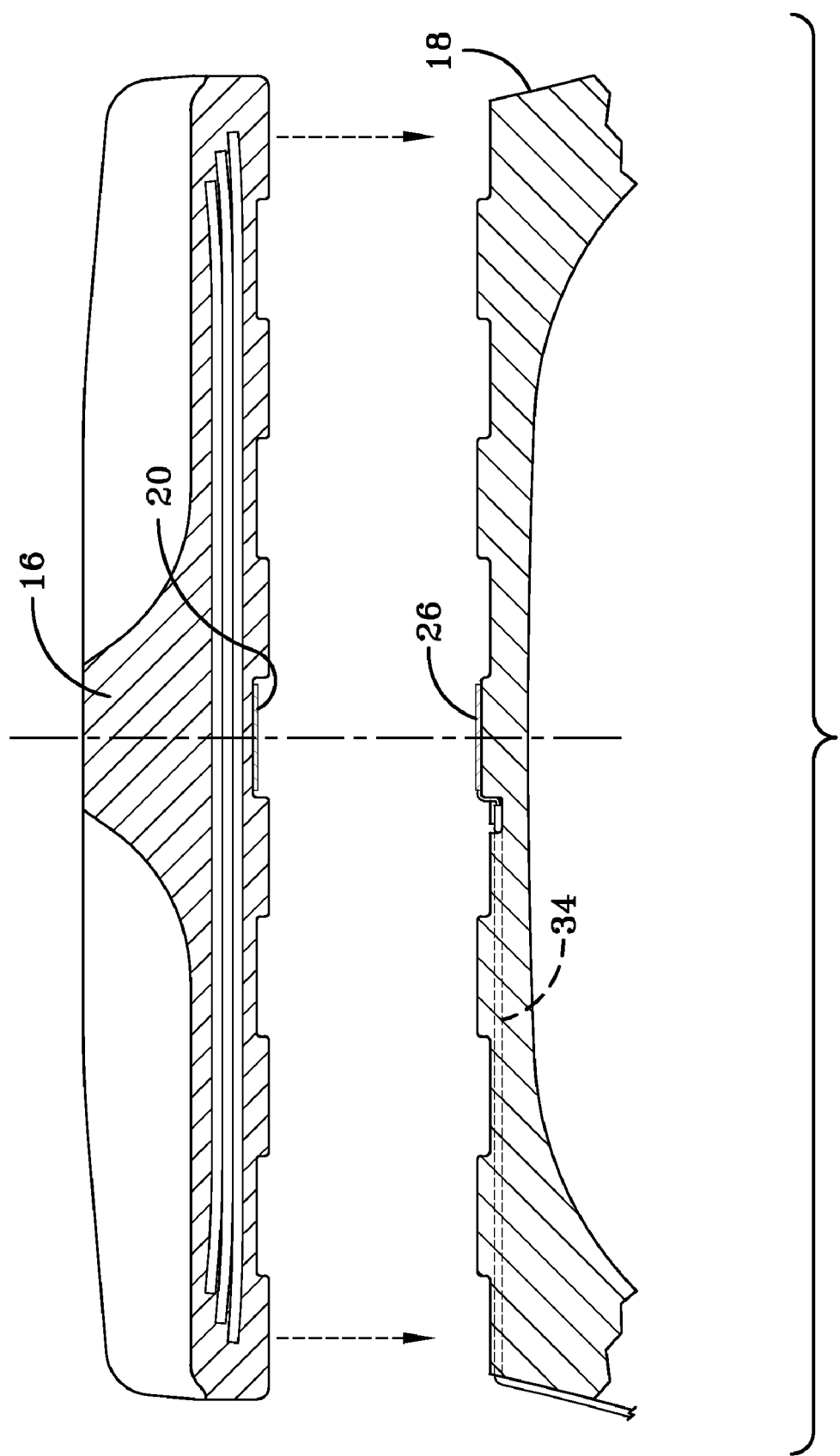

TIRE SENSOR SYSTEM AND METHOD

FIELD OF THE INVENTION

The subject invention relates generally to sensor systems for tires and, more specifically, to a sensor system for multi-piece tires.

BACKGROUND OF THE INVENTION

It is important in multi-piece tire construction, particularly in two piece off-the-road (OTR) tires, to maintain tire structural integrity. Such is particularly important since proper tire inflation pressure may not always be maintained at the recommended level. The need to maintain tire structural integrity throughout the product life is, accordingly, an ongoing objective of both tire manufacturers and tire users.

SUMMARY OF THE INVENTION

According to one aspect of the invention, a tire and sensor system includes a tire having an inflatable radially inward tire casing and a radially outward tire tread ring situated on the casing and a sensor system. The sensor system includes a first conductive member affixed to a radially inward surface of the tread ring and a second conductive member affixed to a radially outward surface of the casing. The second conductive member operatively contacts the first conductive member in a desired, relative orientation between the tire casing and the tread ring and operatively separates from the first conductive member when tire casing and the tread ring depart from the desired orientation. A sensor is connected to the second conductive member for operatively detecting separation of the second conductive member from the first conductive member.

In another aspect of the invention, the first conductive member extends continuously about the tread ring and the second conductive member includes at least one gap. A separation of the second conductive member from the first conductive member operatively creates an open circuit in the second conductive member. The sensor is a continuity sensor that detects the presence of the open circuit.

According to another aspect, the sensor further includes a wireless transmitter for transmitting data indicative of the position of the second conductive member relative to the first conductive member which in turn is indicative of the relative position of the tread ring and the tire casing.

Pursuant to yet another aspect, a method for sensing a relative orientation between a tire radially inward casing and tire radially outward tire tread ring situated on the casing includes: affixing a first conductive member to a radially inward surface of the tread ring; affixing a second conductive member to a radially outward surface of the casing; placing the second conductive member in contact with the first conductive member in a first relative orientation between the tire casing and the tread ring; deploying a sensor to operatively detect separation of the second conductive member from the first conductive member. The method further may include separation of the second conductive member from the first conductive member by a change in desired relative orientation between the tread ring and the tire casing such as, but not limited to, a deflation of the tire casing that causes a separation of the casing from the tread ring.

DEFINITIONS

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including beads, if used, on any alternative rim attachment.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Placement" means positioning a cord on a surface by means of applying pressure to adhere the cord at the location of placement along the desired ply path.

"Ply" means a layer of rubber-coated parallel cords.

"Radial" and "radially" mean directed toward or away from the axis of rotation of the tire.

"Radial Ply Tire" means a belted or circumferentially restricted pneumatic tire in which at least one ply has cords which extend from bead to bead and are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

"Winding" means a wrapping of a cord under tension onto a convex surface along a linear path.

BRIEF DESCRIPTION OF THE DRAWINGS

The invention will be described by way of example and with reference to the accompanying drawings in which:

FIG. 5A is an enlarged view taken from FIG. 5.

DETAILED DESCRIPTION OF THE INVENTION

Figure 1:
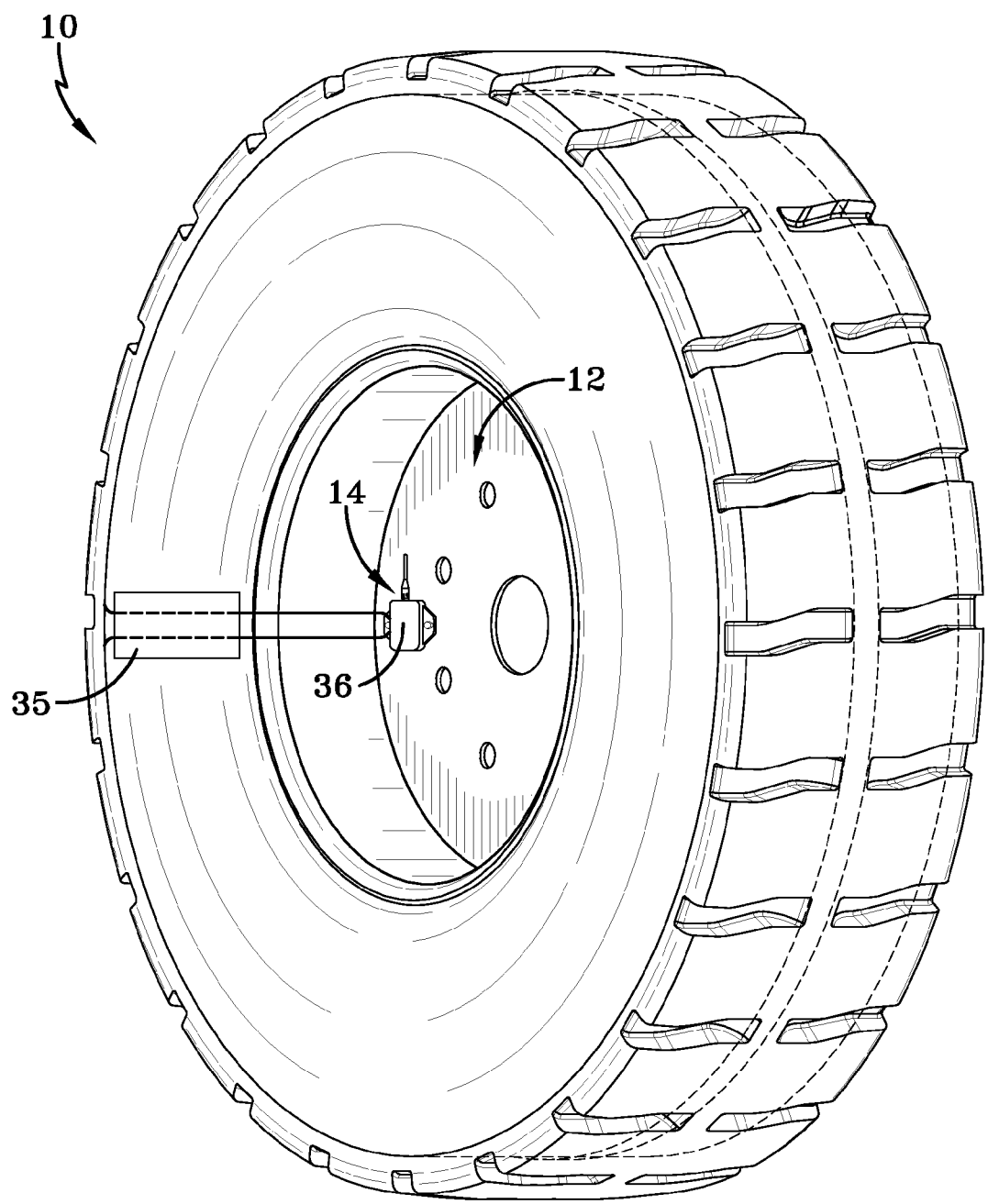
FIG. 1 is an assembled perspective view of a multi-piece tire and sensor system.
Figure 2:
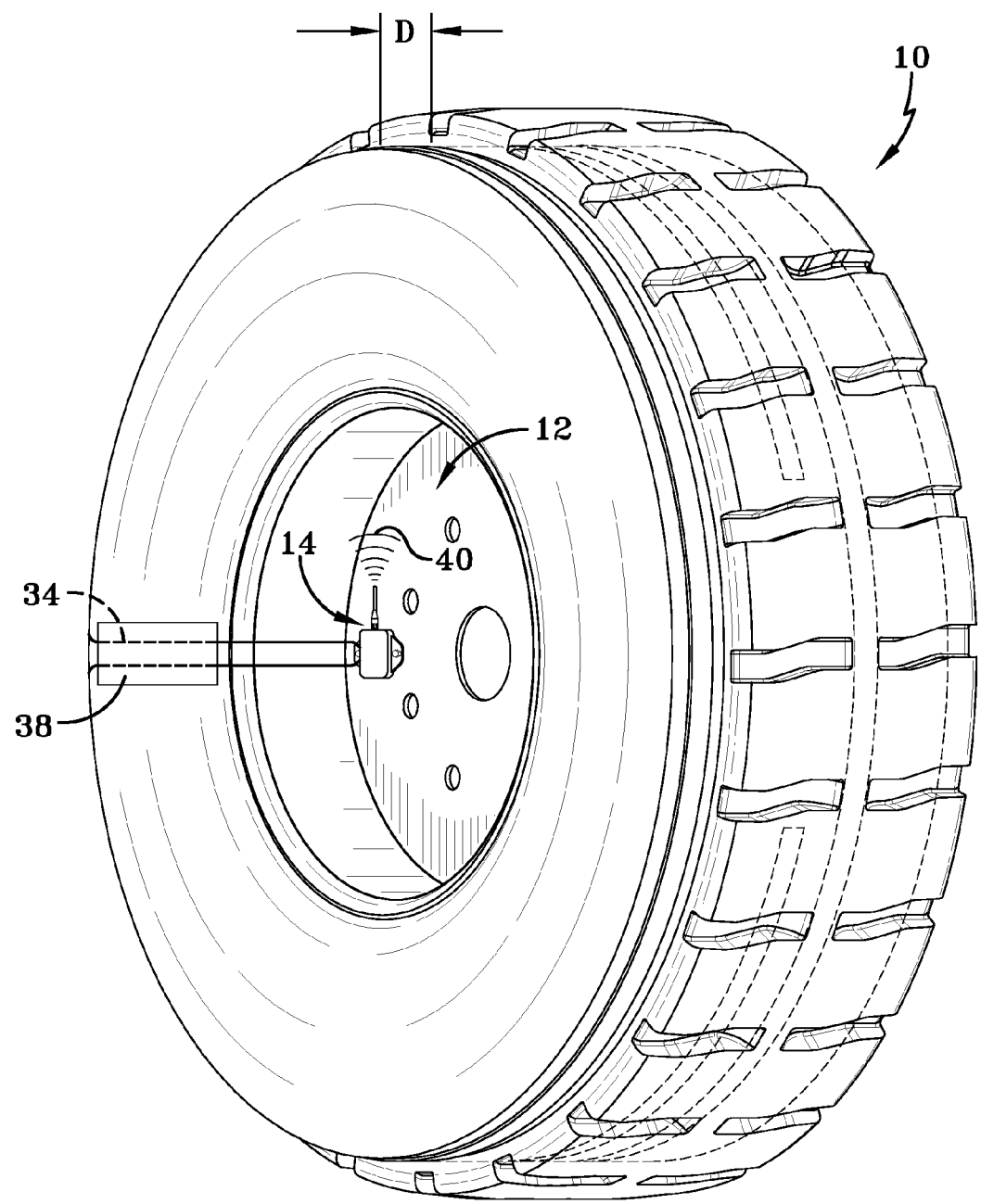
FIG. 2 is a perspective view of the multi-piece tire and sensor system showing the tread ring moving off the casing and consequential transmission of a signal.

Referring first to FIGS. 1, 2, 3, and 4, a conventionally constructed multi-piece tire 10 is mounted to a rim 12 in a manner common to the industry. A sensor system 14 is mounted to the tire and rim assembly and, with the tire 10, constitutes a tire and sensor system. The tire 10 may be constructed from multiple component parts that form radially oriented layers. The sensor system 14, as will be appreciated, may be deployed and utilized to detect the dislocation of one tire component to an adjacent tire component. While the sensor system may be used generally with any multi-piece tire, the sensor system is particularly useful in detecting the dislocation of an outer tread ring 16 relative to a radially inward tire casing 18 in a two-piece tire having a sidewall 19.

In general, in such two-piece tires, it is desirable that the tread ring 16 stay properly positioned on the casing 18 under different loading conditions. Dislocation or loss of the tread ring 16 may render the tire inoperable. Consequently, the tread ring and the casing construction and attachment are optimized to reduce the possibility that the tread ring will separate during operating conditions. Such optimization relies upon the maintenance of the casing 18 in a properly inflated condition. However, it is possible that the air pressure within the casing 18 will not be maintained at a desired level during operation. An underinflated casing may result in lateral tread dislocation, belt breakage, or radial tread separation from the casing. The subject sensor system 14 is intended to collectively detect such events and issue a warning signal to the operator. The sensor system 14 checks whether the tread ring is properly seated on the casing and warns the operator when the tread ring is missing or has moved laterally with respect to the casing or the casing, due to underinflation, as moved radially inward from the tread ring.

The sensor system 14 is comprised of an outer conductive member or medium 20 mounted to a radially inward surface 22 of the tread ring 16. The tread ring 16 has multiple circumferential grooves 24 within the surface 22. In the embodiment shown, the medium 20 is configured as a conductive circular band that is positioned at the equatorial center of the tread ring 16 within a central one of the grooves 24. So positioned, the conductive band 20 is recessed within the surface 22, extending to the top of the resident groove. Other alternative configurations for the outer conductive medium 20 in other alternative locations on the outer ring 16 may be employed if so desired. It will be appreciated that the centered location of the conductive medium 20, preferred but not necessary, facilitates an alignment with an opposite conductive medium of the casing as will be explained.

The sensor system 14 further includes a second, inner conductive medium or member 26 that is mounted on the centerplane of the casing 18. As best seen from FIGS. 3 and 4, the inner conductive medium 26 is configured as a circumferentially extending circular assembly of two semi-circular components 26A and 26B formed of electrically conductive material. The casing 18 includes a radially outward surface 28 having a series of circumferential grooves 30 formed therein, including one along the equatorial centerplane of the casing. The components 26A and 26B reside within the one central groove and extend from the top of the groove. Other alternative configurations for the inner conductive medium 26 in other alternative locations on the casing may be employed if desired so long as the location and configuration of the inner, second medium 26 operably complements the location and configuration of the outer medium 20.

The components 26A and 26B are dimensioned to extend about the casing so as to leave a pair of end gaps 32. The outer surfaces of the components 26A and 26B are configured to complement the radially inward surface of the outer medium 20 to allow for close abutting contact therebetween when the casing is inflated to its recommended air pressure. Spanning one of the gaps 32, is a wiring network 34 that extends to a sensor/transmitter module 36 mounted on the wheel rim 12. The wiring 34 extends within grooves formed within the sidewall 19 so as to protect the wiring from external objects. An adhesive tape 35 may be applied over the wiring 34 where it traverses the sidewall 19 to secure the wiring into the sidewall grooves and prevent wiring dislocation.

Figure 3:
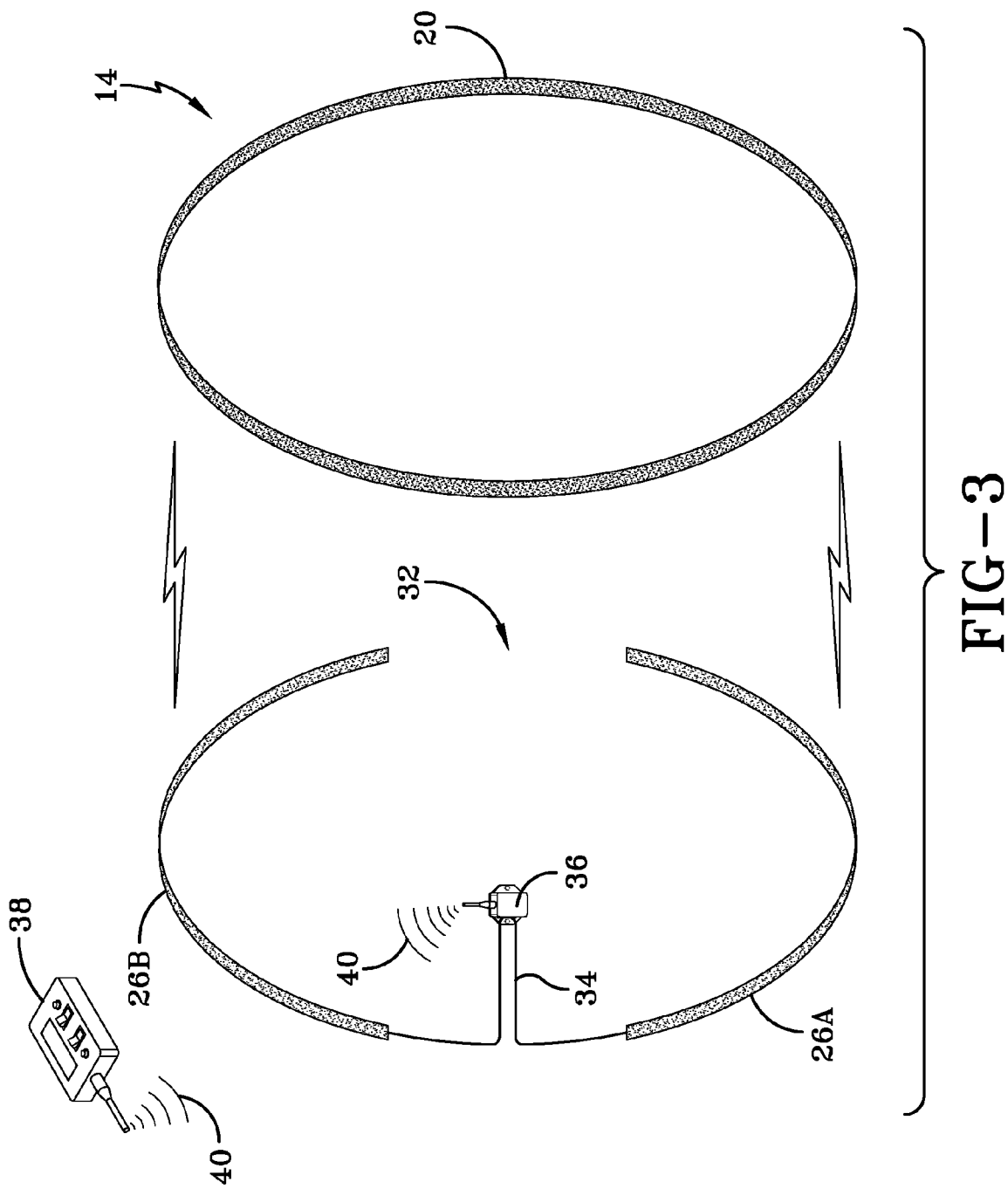
FIG. 3 is a diagrammatic view of the electrical components of FIG. 2 showing the casing medium with the wired transmitter sending a signal to a receiver responsive to the tread ring medium moved off contact.
Figure 4:
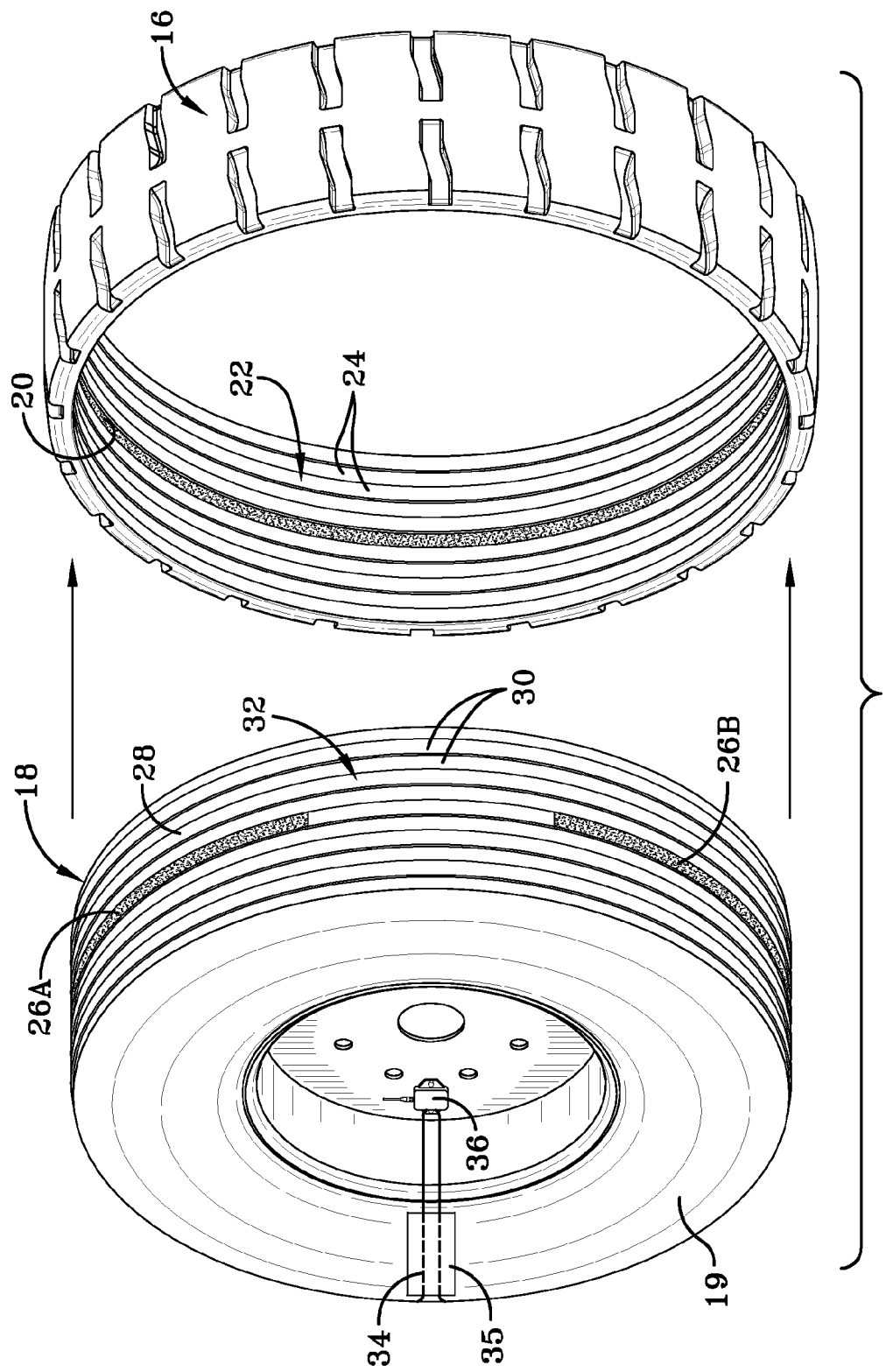
FIG. 4 is a perspective view of the tread ring and casing before assembly.

The sensing system module 36 may be housed within a housing that bolts through the rim 12 or otherwise alternatively attached to the wheel assembly in alternative locations if desired. The sensing system as represented in FIG. 3 includes a sensing medium to detect dislocation of the tread ring 16 relative to the casing 18; a continuity sensor; a wireless transmitter module (with amplifier, signal conditioner, and power supply) and a wireless receiver (with visual or audio warning capability to the operator of the vehicle). The electronic components comprising the transmitter module and the receiver/warning device are of a type commercially available. The conductive medium of the FIG. 3 assembly includes the one continuous layer 20 inside the center groove of the tread ring 16 and two separate layers 26A, 26B outside the center rib of the casing 18 with circumferential gaps 32. The conductive medium 20, 26 may be formed of various conductive materials and applications, such as but not limited to, conductive adhesives, inks, or paints: conductive fabrics having metal filaments; metals. Such materials are common within the industry.

The sensing system continuity sensor is preferably but not limited to a Wheatstone bridge circuit having a constant voltage excitation. An open circuit created by dislocation of sensing medium 20 relative to sensing medium 26 will be detected by the continuity sensor as a change in impedance. The change in impedance accordingly will cause a transmitted signal 40 to be generated by the wireless transmitter within the module 36. The transmitter and receiver 38 are of a type and model commercially available. A V-Link wireless transmitter manufactured by MicroStrain Co. is one suitable transmitter. A wireless receiver such as the Agile-Link receiver manufactured by MicroStrain Co. is one suitable receiver. The receiver 38 receives the signal 40 and provides communication to the operator of the vehicle. The output can be a simple warning light on the dashboard or an audible alarm.

Figure 5:
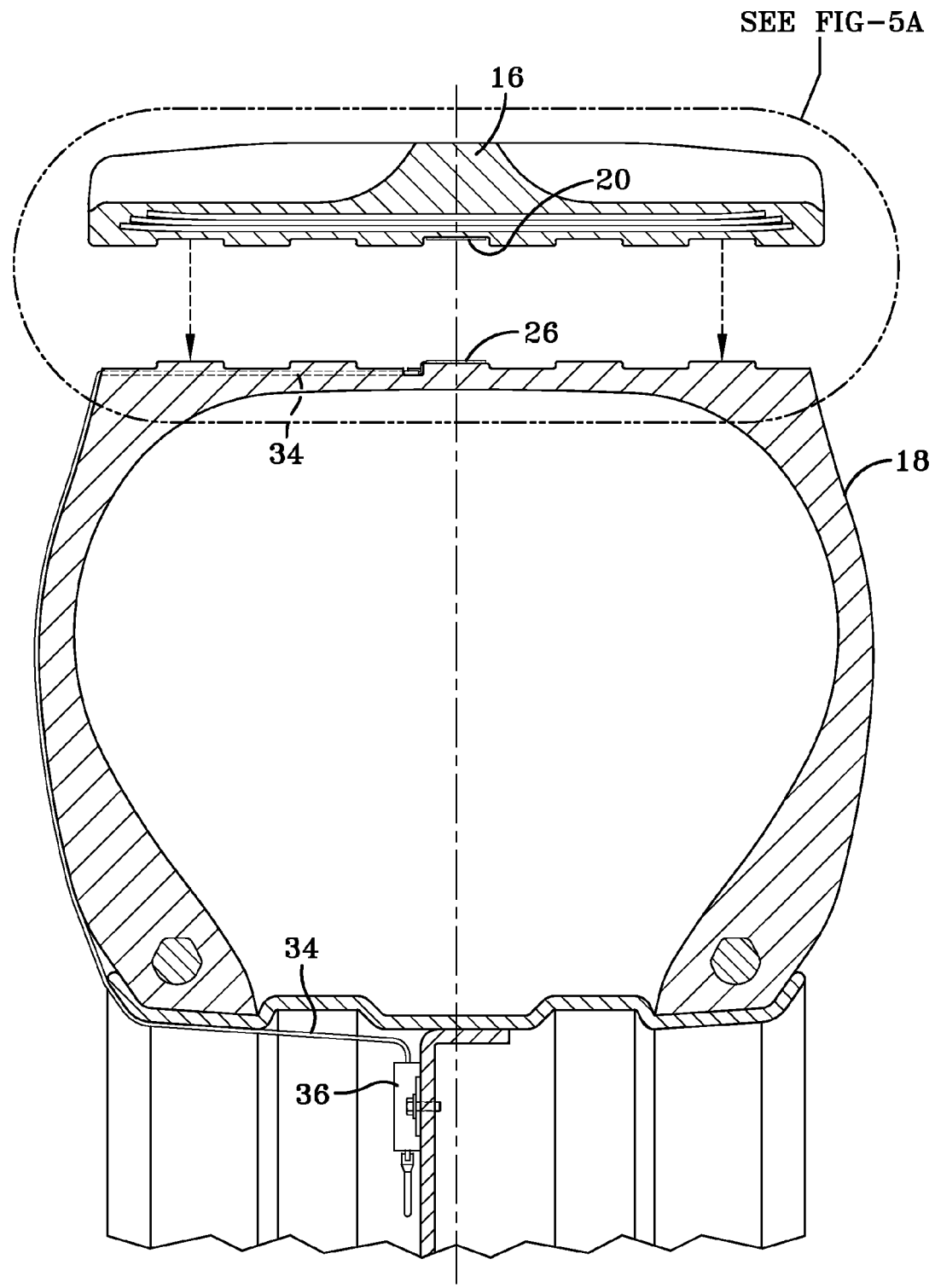
FIG. 5 is a cross-sectioned exploded view of the tire and sensor system showing the conductive medium locations.
Figure 6:
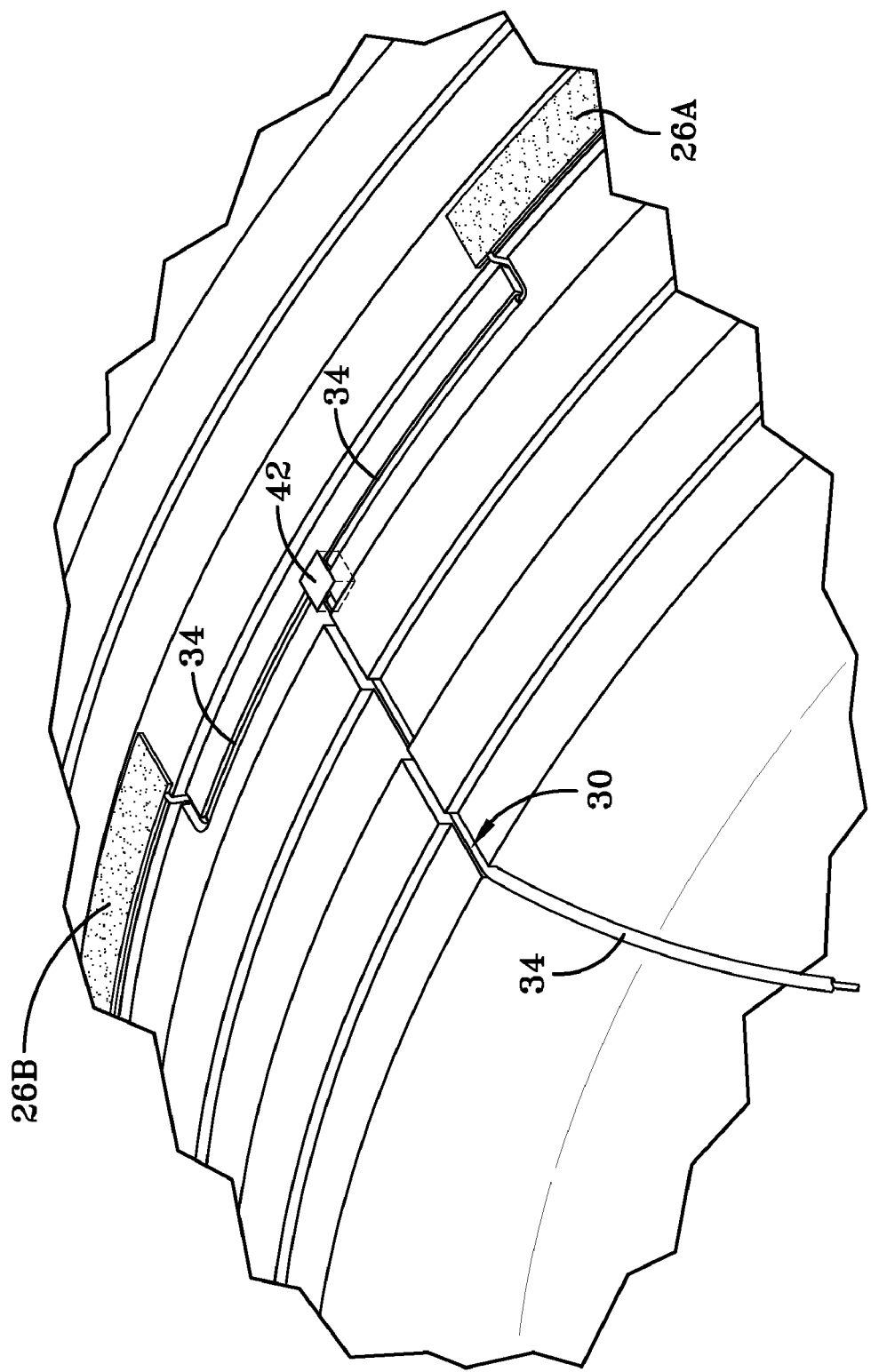
FIG. 6 is an enlarged view of the tire tread ring and casing with the sensor system wire routing from the casing conductive medium to the transmitter.

With reference to FIGS. 5 and 5A, the tread ring 16 is assembled to the casing 18 as shown, with the centers of each component aligned. Such an alignment places the outer conductive medium 20 of the tread ring 16 over the inner conductive medium 26 of the casing 18. The wiring 34 routes upward along the sidewall of the tire and into a groove 30 in casing 18 as shown by FIG. 6. A connector 42 splits the wiring 34 into conductors that attach to the medium components 26A and 26B. The conductive mediums 26A and 26B project upward from the outer surface of the casing so that contact is established between conductive medium 26 and medium 20 of the tread ring with the attachment of the tread ring to the casing.

Figure 7:
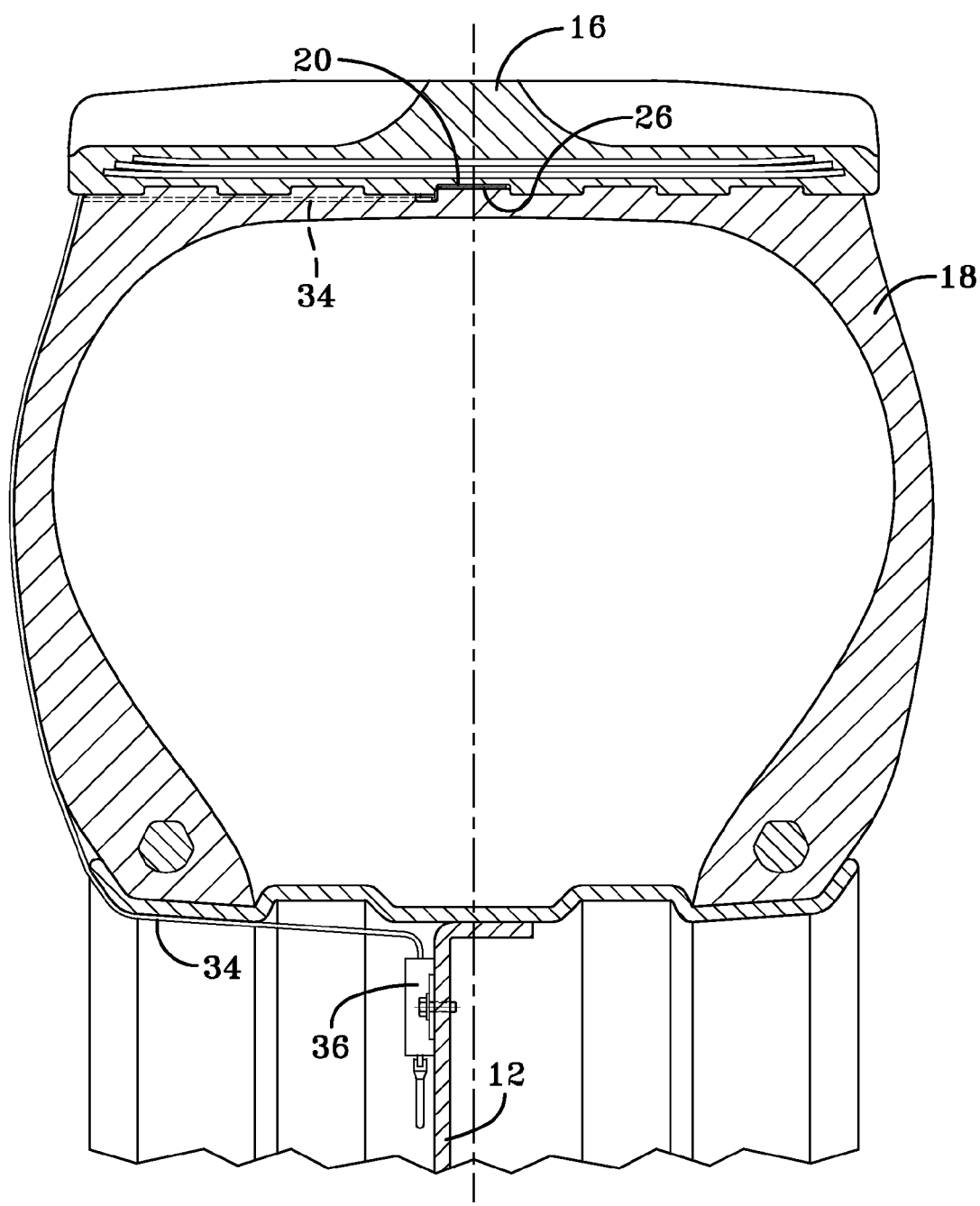
FIG. 7 is a cross-sectional assembled view of the tire and sensor system showing the conductive medium locations.

FIG. 7 shows the tread ring and casing assembled and the wire 34 routing to the transmitter 36. The internal air pressure of the casing 18 radially forces the medium 26 into a positive contact with the medium 20 and a completed circuit is establish as the medium 20 closes the gap 32 between ends of medium components 26A and 26B. So long as the tread ring is in a proper alignment with the casing, contact between mediums 20, 26 is maintained and the circuit is closed. The transmitter 36 does not transmit a signal to the receiver and no warning of a tread ring dislocation is given to the operator.

Figure 8:
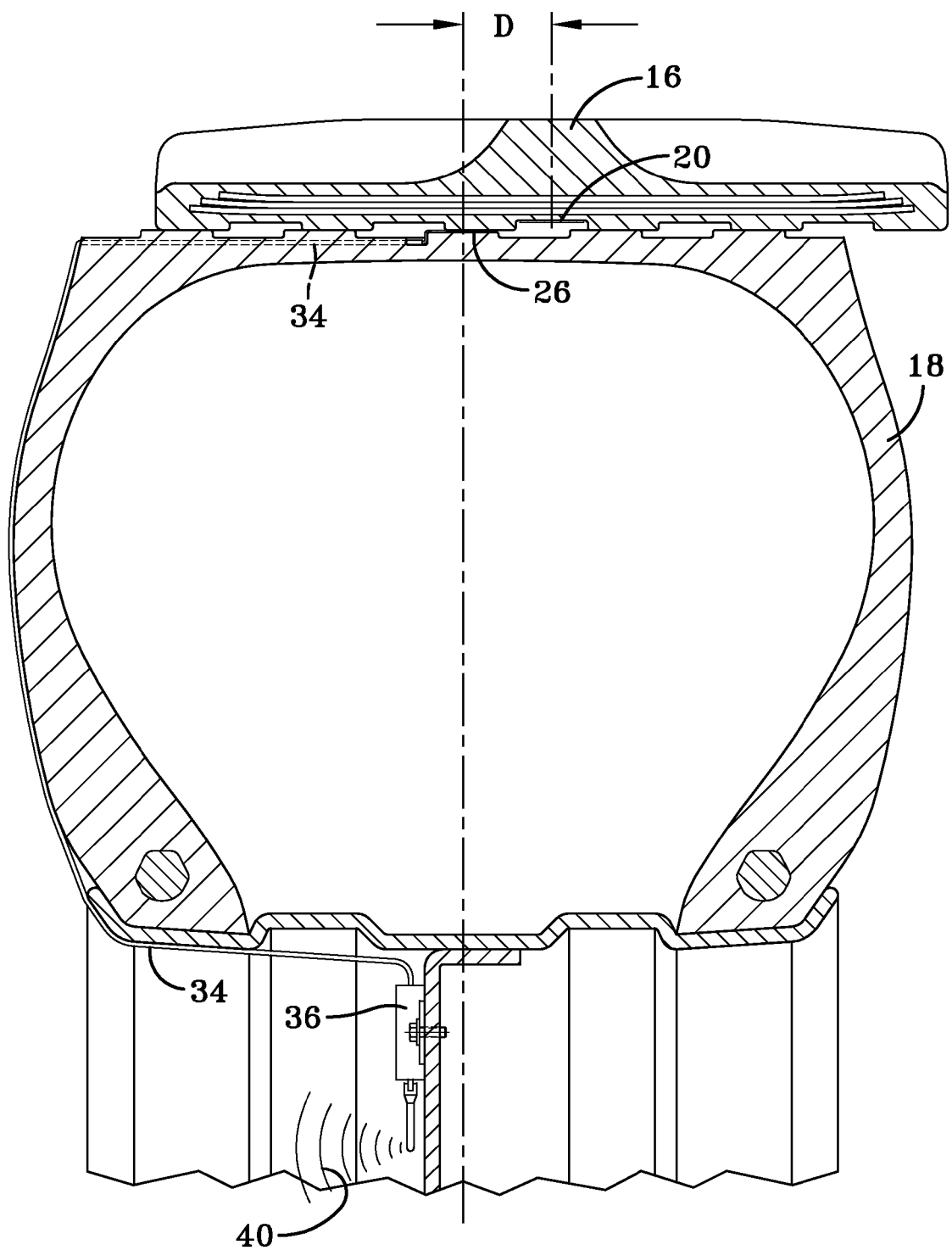
FIG. 8 is a cross-sectioned view of the tire and sensor system showing the dislocation of the tread ring off center from the casing and the transmitter in the consequent signaling mode.

However, should the tread ring 16 become dislocated by a distance "D" relative to the casing 18, such as shown in FIG. 8, contact between the medium 20, 26 occurs, creating an open circuit condition detected by the continuity sensor within module 36 (e.g., a Wheatstone bridge). Detection of the open circuit causes a warning transmission 40 from the wireless transmitter after requisite amplification and signal conditioning. The signal is then received by the wireless receiver 38 which initiates a warning to the operator. It will be appreciated that the dislocation of the tread ring medium 20 relative to the casing medium 26 prompting a warning may be the result of a lateral displacement of the tread ring relative to the casing as shown in FIG. 8. Such a dislocation may also occur if the tread ring detaches from the casing and moves radially outward, causing the medium 20 to radially move out of contact with medium 26. Such a dislocation may further occur if the casing 18 moves or contracts radially inward such as in an underinflated condition. The radial deflation of the casing 18 likewise causes the medium 20 to detach from contact with medium 26 to create an open circuit.

From the foregoing, it will be appreciated that the subject sensing system operates to detect dislocation of the tread ring 16 relative to the casing in multiple dimensions. Lateral dislocation of the tread ring, radial outward dislocation of the tread ring, and radial movement of the casing are all detected and result in an alarm to the operator. Thus, the subject invention provides an automated system to detect tread throw or belt breaks and eliminate the possibility of a casing operating without the tread ring or in an under-inflated condition. The automated system is designed to check if the tread ring is properly seated on the casing and warn the driver when the tread ring is missing or has moved laterally.

The system deploys one conductive medium 20 that is continuous and attached to the surface of the tread ring. The conductive medium 26 on the casing has two semi-circular components 26A and 26B with two gaps 32 between them. One of the gaps is closed by the sensor and the second gap, 180 degrees away from the sensor, will be closed if the tire is properly mounted and inflated. If the casing loosens from the tread ring or if the casing is under-inflated, the resistive circuit will open and trigger the alarm. It should be noted that when the casing is inflated, the gap between the casing and the tread ring will disappear and the two conductive media will be in contact at the interface. The system thus uses inflation within the casing to cause and maintain contact between the medium 20, 26.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire and sensor system comprising:
a tire having an inflatable radially inward tire casing and a radially outward tire tread ring situated on the casing;
a first conductive member affixed to a radially inward surface of the tread ring;
a second conductive member affixed to a radially outward surface of the casing, the second conductive member operatively contacting the first conductive member in a first relative orientation between the tire casing and the tread ring and operatively separating from the first conductive member in a second relative orientation between the tire casing and the tread ring;
sensor means connected to the second conductive member for operatively detecting separation of the second conductive member from the first conductive member.

2. The tire and sensor system of claim 1, wherein the first conductive member extends continuously about the tread ring and the second conductive member includes at least one gap.

3. The tire and sensor system of claim 2, wherein a separation of the second conductive member from the first conductive member operatively creates an open circuit in the second conductive member.

4. The tire and sensor system of claim 3, wherein the sensor means comprises a continuity sensor.

5. The tire and sensor system of claim 4, wherein the continuity sensor comprises a Wheatstone bridge circuit.

6. The tire and sensor system of claim 2, wherein the first conductive member comprises a circumferentially continuous layer composed of conductive material.

7. The tire and sensor system of claim 6, wherein the second conductive member comprises a plurality of layers composed of conductive material and disposed on the tire casing and forming at least one gap located between opposing layer ends.

8. The tire and sensor system of claim 1, wherein the sensor means further comprises a wireless transmitter for transmitting data indicative of the position of the second conductive member relative to the first conductive member.

9. The tire and sensor system of claim 8, wherein the data indicative of the position of the second conductive member relative to the first conductive member is operatively indicative of the relative position of the tread ring and the tire casing.

10. The tire and sensor system of claim 1, wherein the sensor means comprises a continuity sensor electrically connected to the second conductive member and a wireless data transmitter.

11. The tire and sensor system of claim 1, wherein the tire casing is in a relatively inflated condition in the first relative orientation with the tread ring and in a relatively deflated condition in the second relative orientation with the tread ring.

12. A method for sensing a relative orientation between a tire radially inward casing and tire radially outward tire tread ring situated on the casing, comprising:
   a. affixing a first conductive member to a radially inward surface of the tread ring;
   b. affixing a second conductive member to a radially outward surface of the casing;
   c. placing the second conductive member in contact with the first conductive member in a first relative orientation between the tire casing and the tread ring;
   d. deploying sensor means to operatively detect separation of the second conductive member from the first conductive member.

13. The method of claim 12, wherein further comprising initiating separation of the second conductive member from the first conductive member by a change in relative orientation between the tread ring and the tire casing.

14. The method of claim 12, wherein further comprising initiating separation of the second conductive member from the first conductive member by the tire casing moving from a relatively inflated condition to a relatively deflated condition.

15. The method of claim 12, wherein further comprising configuring the sensor means to detect a discontinuity in the second conductive member after separation of the second conductive member from the first conductive member.

16. The method of claim 12, wherein further comprising transmitting data to a remote receiver indicative of the position of the second conductive member relative to the first conductive member.

* * * * *